United States Patent [19]
Landy

[11] Patent Number: 5,725,189
[45] Date of Patent: Mar. 10, 1998

[54] MEDIA MOUNTING DEVICE FOR MOTOR VEHICLES

[75] Inventor: Richard Landy, Castaic, Calif.

[73] Assignee: QS Holding Company, Irving, Tex.

[21] Appl. No.: 658,576

[22] Filed: Jun. 5, 1996

[51] Int. Cl.⁶ ............................................... A44B 1/18
[52] U.S. Cl. ........................ 248/205.2; 248/346.03; 248/917
[58] Field of Search .................... 248/205.2, 146, 248/346.01, 346.03, 917, 918

[56] References Cited

U.S. PATENT DOCUMENTS

| | | | |
|---|---|---|---|
| 3,365,070 | 1/1968 | Miles | 248/146 X |
| 4,313,112 | 1/1982 | Foster | 248/918 X |
| 4,483,572 | 11/1984 | Story | 248/918 X |
| 5,238,146 | 8/1993 | Thorne, Jr. | 248/146 X |
| 5,337,985 | 8/1994 | Hale | 248/205.2 X |
| 5,356,099 | 10/1994 | Sereboff | 248/918 X |
| 5,370,241 | 12/1994 | Silvers | 248/205.2 X |
| 5,467,952 | 11/1995 | Martin | 248/346.01 X |
| 5,475,382 | 12/1995 | Yuen et al. | 248/146 X |
| 5,492,298 | 2/1996 | Walker | 248/346.01 |
| 5,597,218 | 1/1997 | Lechman | 248/346.01 X |

*Primary Examiner*—Lanna Mai
*Attorney, Agent, or Firm*—Fish & Richardson P.C.

[57] ABSTRACT

An electronic device support apparatus including a wedge-shaped stand portion of light-weight material to support an electronic device. The support apparatus supports any type of electronic device, including a television set, a VCR, both a television and a VCR, any video monitor, a stereo, etc. The support apparatus is light-weight and portable and particularly suited to support an electronic device in an automobile. In one embodiment, the apparatus includes a support strap coupled to the stand and adapted to surround the exterior of the electronic device. The support strap includes a closure means for retaining the support strap at a location adjacent to the exterior of the electronic device.

20 Claims, 2 Drawing Sheets

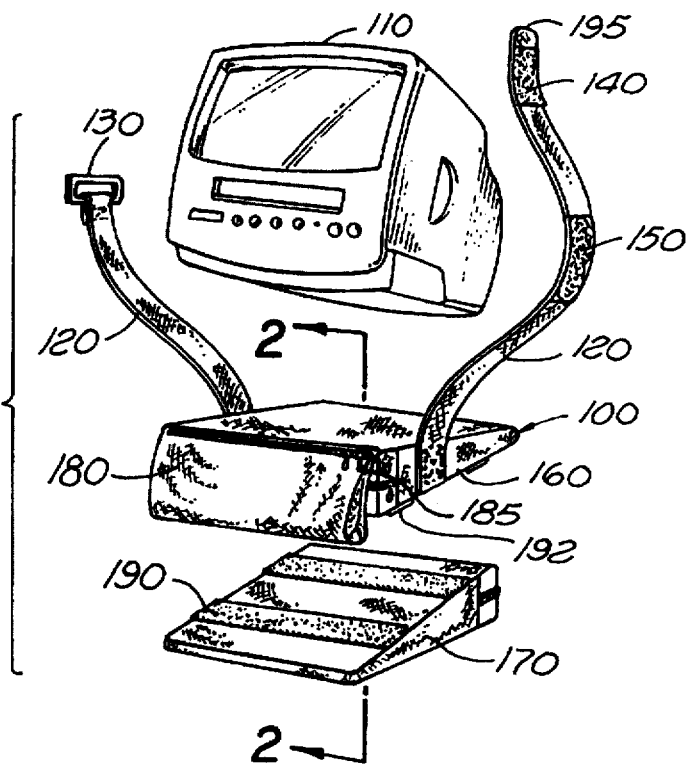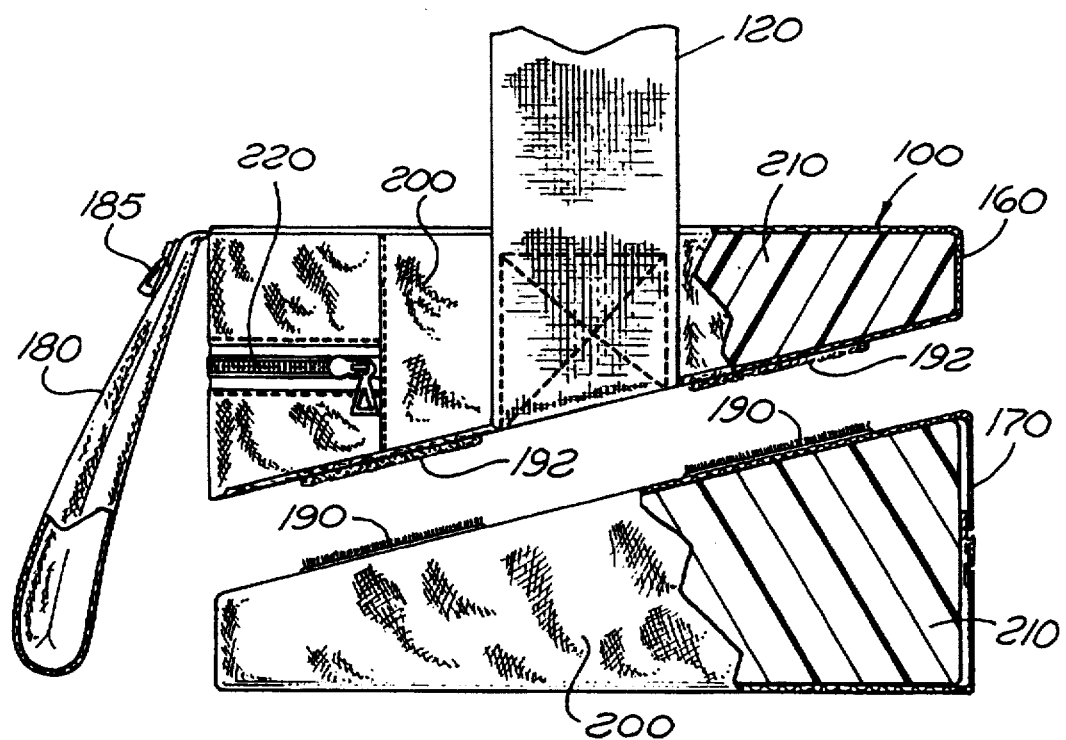

MEDIA MOUNTING DEVICE FOR MOTOR VEHICLES

BACKGROUND OF THE INVENTION

1. Field of the Invention

The invention relates generally to electronic devices and more particularly to support stands for such devices in motor vehicles.

2. Background of the Invention

Electronic devices include video monitors, computers, stereos, televisions, video cassette recorders ("VCRs"), radios, compact disc players, etc., and any combination of one or more of these or similar items. It is well-known to use electronic devices in homes or offices in connection with an AC or DC power source, e.g., a wall socket or batteries. In recent years, it has also been desirable to take electronic devices into motor vehicles, like automobiles, boats, and airplanes. This trend is particularly evident in automobiles. In addition to the standard automobile radio or stereo, many families are increasingly interested in providing other electronic device alternatives. Consequently, car, truck, van, and motor home manufacturers and suppliers are aware of the need to provide for the installation or accommodation of various electronic devices, particularly video screens (e.g., television) in their automobiles.

Electronic devices are generally expensive. Thus, there is a need to support these devices in a vehicle to avoid damage. However, quite often, there is a desire not to make the electronic device or its supporting apparatus a permanent fixture of the vehicle. One reason is that automobiles with an electronic device prominently displayed, immediately become the target of thieves. A second reason to not permanently affix an electronic device supporting apparatus to a vehicle is that an empty electronic device supporting apparatus is not an attractive feature of a vehicle's interior. Consequently, what is needed is an inexpensive apparatus for supporting an electronic device in a motor vehicle. The inexpensive electronic device supporting apparatus should also be removable and transportable.

Available electronic device support apparati do not offer the functionality of multiple retention angles. A single retention angle for an electronic device that is a radio or stereo is acceptable. However, electronic devices that are video monitors are better supported with support apparati that offer multiple viewing angles to a vehicle audience with different viewing preferences. Consequently, what is needed is an electronic device support apparatus that offers the functionality of multiple retention angles.

SUMMARY OF THE INVENTION

The invention relates to an electronic device support apparatus. The apparatus includes a wedge-shaped stand portion of light-weight material capable of supporting an electronic device. The invention contemplates that the support apparatus supports any type of electronic device, including a television set, a VCR, both a television and a VCR, any video monitor, a stereo, etc. The support apparatus is particularly suited to support an electronic device in an automobile.

In one embodiment of the invention, the stand portion of the support apparatus includes two wedge-shaped light-weight material stand portions, each portion encapsulated in a nylon covering, and a coupling means to detachably couple the pair of stand portions. A single wedge-shaped stand portion will support the electronic device, with the pair used together to vary the retention angle of the electronic device relative to a horizontal plane. In this embodiment, the pair of stand portions define various retention angles relative to a horizontal plane dependent on the alignment of the wedge-shaped stand portions relative to one another. A first retention angle is defined by a single stand portion used alone. A second and third stand retention angle are defined by the pair of stand portions coupled together in different configurations. A second stand retention angle is formed when the tapered ends of the wedge-shaped stand portions are adjacent to one another, and the third stand retention angle is formed when the tapered ends oppose one another.

In another embodiment, the stand portion includes a support strap coupled to the stand and adapted to surround the exterior of the electronic device. The support strap includes a closure means for retaining the support strap at a location adjacent to the exterior of the electronic device.

The electronic device support apparatus is light-weight and can be easily maneuvered and handled inside or outside a vehicle. An embodiment of the light-weight material includes foam, and more particularly, polystyrene foam. Further, the light-weight construction makes the apparatus portable so that it may be removed easily from a vehicle at the operator's discretion.

BRIEF DESCRIPTION OF THE DRAWINGS

The features, aspects, and advantages of the invention will become more thoroughly apparent from the following detailed description, appended claims, and accompanying drawings in which:

FIG. 1 is an exploded, perspective view of an electronic device support apparatus and an electronic device.

FIG. 2 is an exploded cross sectional side view of a portion of one embodiment of the electronic device support apparatus.

DETAILED DESCRIPTION OF THE INVENTION

Figure 3:
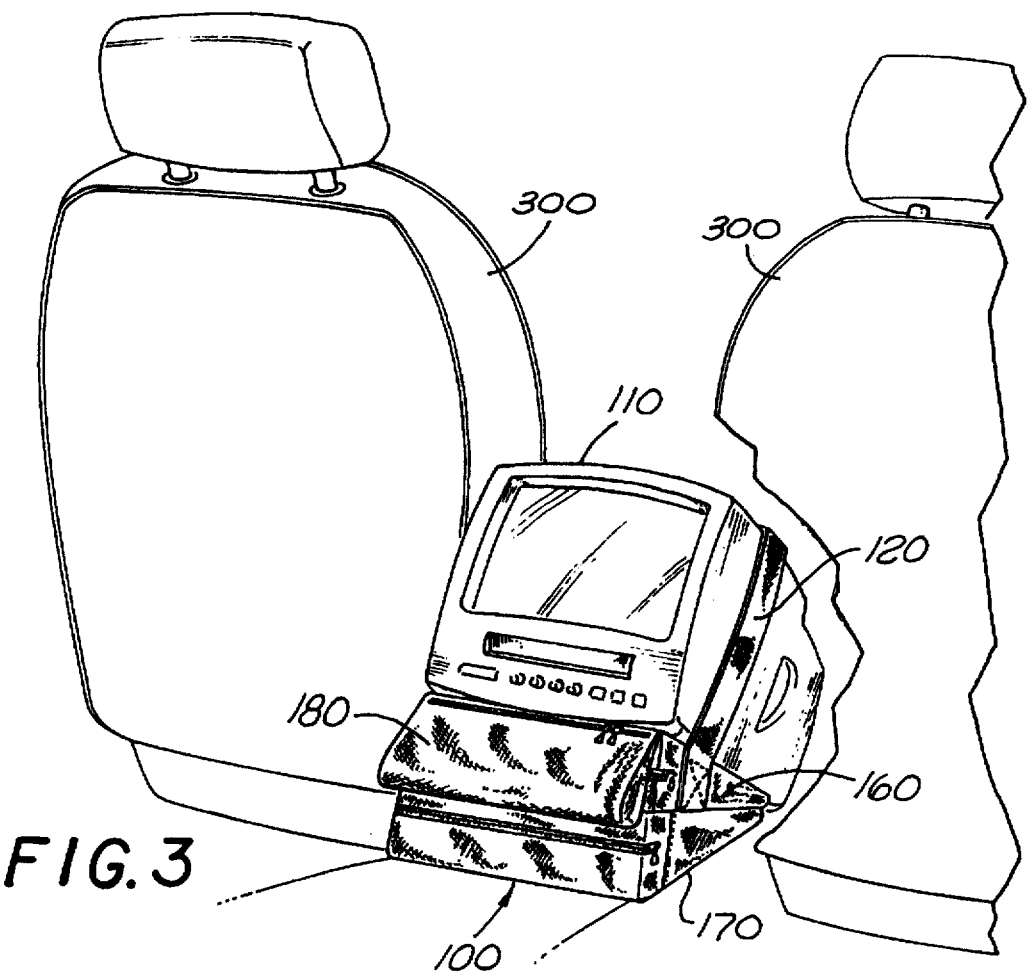
FIG. 3 is a perspective view of an electronic device support apparatus supporting an electronic device in an automobile.

An apparatus is described for supporting an electronic device. In the following description, numerous specific details are set forth such as specific materials, fasteners, etc., in order to provide a thorough understanding of the invention. It will be clear to one skilled in the art, however, that these specific details need not be employed to practice the invention. Further, a specific embodiment of the invention is presented below and should be regarded only as illustrative of the claimed invention.

FIG. 1 illustrates an exploded, sectional view of an electronic device support apparatus 100 supporting an electronic device 110. The electronic device 110 in FIG. 1 is a combination television and VCR. FIG. 1 might represent, for example, a nine inch television with built in VCR. It is to be recognized that the invention is not limited to a TV/VCR stand apparatus, but will function equally well with any electronic device. The electronic device stand apparatus 100 includes a stand portion of two wedge-shaped portions 160 and 170. The wedge-shaped stand portions 160 and 170 are coupled together, for example, through mating hook and loop type fasteners 190 and 192. A single wedge-shaped portion 160 or 170 will support the electronic device 110, however, the pair are utilized in FIG. 1. One wedge-shaped stand portion 160 has an optional storage pouch 180 coupled thereto. The storage pouch can store various items, including items associated with the electronic device such as extension cords, batteries, headphones, etc. The storage pouch contains a zipper mechanism 185 to retain the pouch 180 in a closed orientation. It is evident that the zipper mechanism 185 is illustrative of the available containment mechanisms for the storage pouch; snaps, buckles, hook and loop material and other such fastening devices could be employed without departing from the scope and contemplation of the invention.

Also attached to the wedge-shaped stand portion 160 is an optional support strap 120. It is evident that the apparatus need not include the support strap to practice the invention and that the electronic device may be supported by a stand portion alone. The support strap 120 included in the embodiment in FIG. 1 is adapted to surround the exterior of the electronic device 110. The support strap 120 is generally flat and made of a durable nylon or nylon-like material. The strap 120 in FIG. 1 is in two portions, with the end of each portion stitched to the wedge-shaped stand portion. It is evident that the strap 120 can be contiguous and extend around the stand portion 160.

In the two-piece strap 120 illustrated in FIG. 1, one free end of the strap 120 includes a buckle 130. The invention contemplates that the other free end 195 of the strap 120 is inserted through the buckle 130 and doubled back on itself to tighten the strap 120 around the electronic device 110. Mating hook and loop type fasteners 140 and 150 are included on the same side of the support strap 120 with free end 195 to secure the support strap 120 to the exterior of the electronic device 110. The strap 120 doubles back on itself and is locked in a closed configuration by the mating of the hook and loop type fasteners 140 and 150. The hook and loop type system, depicted by numerals 140 and 150, is sufficiently long and disposed along a sufficient length of the strap 120 that the strap will have the desired length when closed around an electronic device to provide the desired snug fit.

It is evident that the buckle system in FIG. 1 is exemplary of the types of embodiments available to secure the strap around the electronic device 110. Other embodiments are also contemplated. Such embodiments include: Hook and loop type fasteners on opposite sides of each end of the strap 120 so that the closure means mate when the strap ends, with or without a buckle on one end, are adjacent to one another; a buckle with a movable tongue for fastening the two support strap ends; other bands or fasteners; snaps; friction-type buckling systems; detachable cable-tie buckle systems; or other systems known in the art.

FIG. 2 illustrates a planar side view of a portion of the electronic device support apparatus taken through line 2 of FIG. 1. FIG. 2 illustrates the stand portion 100 made up of two wedge-shaped portions 160 and 170. In the embodiment shown in FIG. 2, each wedge-shaped portion 160 and 170 includes an inner portion 200 that is a lightweight material, e.g., polystyrene foam or plastic, surrounded by a covering 210. This particular embodiment contemplates that the inner portion 200 is a light-weight material wherein the stand portion is strong enough to support an electronic device, yet lightweight enough to be easily manipulated or transported by carrying means. A foam, foam-like, plastic, or plastic-like material is ideal for this purpose. The embodiment depicted in FIG. 2 also illustrates the inner stand portion 200 as being a single wedge-shaped form. It is evident that the inner stand portion 200 can be unitary, as illustrated, or constructed piecemeal with, for example, a pair of polystyrene foam pieces or other materials.

In the embodiment illustrated in FIG. 2, the outer portion 210 of the stand portion 170 is a resilient nylon or nylon-like material of various colors. The nylon or nylon-like material is preferred because of its light-weight construction and durability. The nylon or nylon-like covering 210 serves cosmetic and functional purposes. Cosmetically, the nylon cover is an attractive accouterment to support an electronic device in, for example, an automobile's interior. Functionally, the nylon or nylon-like covering provides a durable shell to which a support strap 120 and pouch 180 can be fastened.

It is evident that the invention is not limited to nylon or nylon-like stand covering portions 210, but other coverings will function equally well. Suitable coverings contemplated by the invention include, but are not limited to, textiles, leather or leather-like materials, and elastomeric materials. More specifically, textiles contemplated for covering the stand portion include, but are not limited to, cotton, canvas, polyester, or other fabric, fiber, or yarn. Leather or leather-like materials include all forms of leather, including, but not limited to, cowhide, suede, and coach. Vinyl or vinyl-like materials include, but are not limited to, polyvinyl, cloth, textured vinyl, and woven vinyl. Elastomeric materials include, but are not limited to, neoprene, latex, rubber, and butyl rubber. These materials may be of any color, may be plain or designs, or may be a mix of colors or designs.

FIG. 2 illustrates that the covering portion 210 of the stand portions 160 and 170 includes a zippered closure mechanism 220 to secure the inner portion 200 inside the outer covering 210. It is evident that the invention is not limited to outer coverings 210 with zippered closure mechanism 220. Other closure mechanisms, including snaps, hook and loop type fasteners, stitching, etc., are also contemplated.

FIG. 2 illustrates a support strap 120 affixed to a single wedge-shaped stand portion 160. In this embodiment, the support apparatus may be used with the single wedge-shaped stand portion 160. Thus, as noted above, the invention contemplates that the wedge-shaped stand portion 160 will support an electronic device by itself and without the aid of the supplemental wedge-shaped portion 170.

Although the invention contemplates that the apparatus will function with the single wedge-shaped stand portion 160, a supplemental stand portion 170 may also be used to further support the electronic device or to vary the support angle of the electronic device, e.g., the viewing angle. In FIG. 2, the separate stand portions 160 and 170 are detachably coupled together through mating hook and loop type fastening mechanisms 190 disposed on a surface of each of the wedge-shaped stand portions 160 and 170. It is evident that the hook and loop type fastening mechanisms are exemplary of the type of fastening mechanisms that can be used to fasten complimentary stand portions 160 and 170. Other fastening means, including snaps, friction, adhesive, etc. are also contemplated.

FIG. 2 illustrates that the strap 120 is coupled to device stand portion 160. The coupling mechanism depicted in FIG. 2 is stitching of the strap 120 to the outer covering material 210. Once again, the stitching is exemplary of the type of coupling mechanism necessary to couple the strap 120 to the stand portion 160. Other coupling mechanisms, including snaps, hook and loop type fasteners, glue, and heat (e.g., melting), are also contemplated.

FIG. 3 illustrates a sectional view of an electronic device stand apparatus supporting an electronic device in an automobile. In FIG. 3, the electronic device support apparatus 100 supporting the electronic device 110 is disposed between a pair of bucket seats 300 in an automobile. In this position, the electronic device 110 might be, for example, a television or a television/VCR, that provides entertainment to passengers seated behind the bucket seats 300. FIG. 3 illustrates the electronic device 110 supported by the electronic device support apparatus 100 including a strap 120 surrounding the exterior of the electronic device 110. The electronic device support apparatus includes a pouch 180 that can hold, for example, an extension cord, batteries, or headphones. The stand portion of the device support apparatus 100 includes two wedge-shaped portions 160 and 170 coupled together. In FIG. 3, the tapered ends of the wedge-shaped portions 160 and 170 are adjacent to one another. In this configuration, the device stand apparatus 100 places the electronic device 110 at approximately a 30° angle from the horizontal, e.g., a 30° angle from the floorboard of an automobile when two 15° stand portion wedges are combined. Where the electronic device is, for example, a video monitor, this 30° angle provides a comfortable viewing angle for passengers seated in an automobile where the electronic device might be significantly below passengers heads.

Figure 4A:
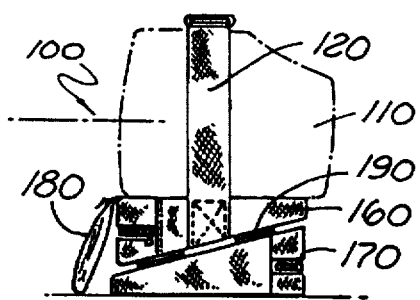
FIGS. 4A–C are planar side views of an electronic device support apparatus supporting an electronic device at different angles.
Figure 4B:
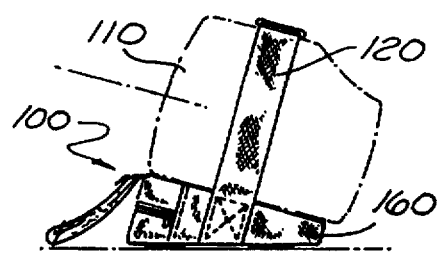
Figure 4C:
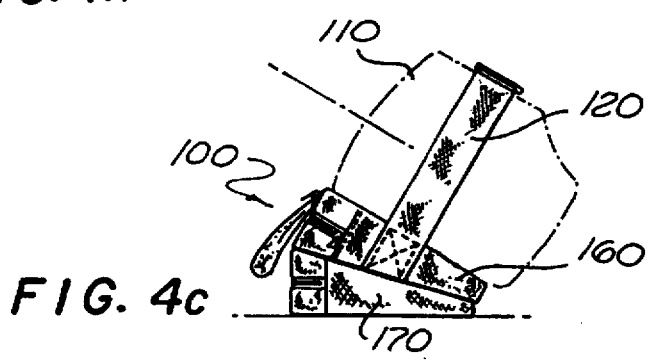

FIG. 4 illustrates a planar side view of an electronic device support apparatus 100 supporting an electronic device at various angles. FIG. 4A illustrates an electronic device support apparatus 100 with a support strap 120 surrounding the exterior of an electronic device 110. The stand portion of the electronic device support apparatus consists of two approximately 15° wedge-shaped portions 160 and 170. In FIG. 4A, the two wedge-shaped portions 160 and 170 are coupled together so that the tapered portions of the wedge-shaped portions 160 and 170 are diagonally opposite one another. In this configuration, the electronic device rests approximately horizontally on the electronic device support apparatus 100. In FIG. 4B, the electronic device support apparatus 100 consists of a single wedge portion 160 with support strap 120 coupled to the wedge portion 160 and surrounding the exterior of the electronic device 110. With the single wedge portion 160 supporting the electronic device, the electronic device is supported at approximately a 15° angle from the horizontal. FIG. 4C illustrates a planar side view of the electronic device support apparatus 100 supporting electronic device 110. The electronic device support apparatus 100 includes two wedge-shaped portions 160 and 170 with the tapered end of each wedge-shaped portion 160 and 170 adjacent to one another. In this configuration, the electronic device 110 is supported by the electronic device stand apparatus at approximately a 30° angle from the horizontal.

To change the angle by which the electronic device 110 is supported by wedge-shaped stand portions 160 and 170 requires only that the wedge-shaped portion 170 be rotated 180°. In the embodiment shown in FIG. 4, hook and loop type fasteners 190 couple the stand portions 160 and 170. Mating portions of the hook and loop type fasteners 190 are positioned so that mating occurs when tapered portions of the wedge-shaped portions 160 and 170 are diagonally opposite (i.e., FIG. 4A) or are adjacent to one another (FIG. 4C). Positioning the coupling means (e.g., hook and loop fasteners) in this manner allows the multiple support position configuration of the invention.

FIG. 4 presented the multiple retention angle feature of the invention in terms of 15° wedge-shaped stand portions. The invention contemplates that other angled wedge-shaped portions may be used. For example, a wedge-shaped portion that is to be used alone, preferably is less than 30° from the horizontal. Wedge-shaped portions designed for combining with other wedge-shaped portions, on the other hand, preferably have 10°–17° angles from the horizontal.

The preferred embodiment described above included a pair of wedge-shaped stand portions. It is evident that a third wedge-shaped stand portion can be added to vary the available support angles for an electronic device. The third wedge-shaped portion can be coupled to the pair of wedge-shaped portions through mating hook and loop type fastening to, for example, wedge-shaped portion 170. One embodiment wherein a third wedge-shaped portion to the device contemplates that one of the three wedge-shaped portions contain hook or loop type fastening material on both its top and bottom surfaces. For example, in the embodiment depicted in FIG. 2, stand portion 160 has hook material 192 that mates with loop material 190 on stand portion 170. A third wedge-shaped portion can be added to the apparatus by the inclusion of an additional wedge-shaped portion with loop material on one surface to mate with hook material 192 of stand portion 160, and hook material on another surface to mate with loop material 190 of stand portion 170. It is evident that when three wedge-shaped portions are stacked together with their tapered ends together, the retention angle can be very steep. Thus, in the situation where three equivalent wedge-shaped portions are stacked together in this manner, it is preferable that each wedge-shaped portion have an approximately 10° angle relative to the horizontal.

In the preceding detailed description, the invention is described with reference to specific exemplary embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. An apparatus comprising:
   a first wedge-shaped stand portion;
   a second wedge-shaped stand portion; and
   detachable coupling means to couple the first stand portion and the second stand portion,
   wherein the pair of stand portions define a first device retention angle relative to the horizontal when the tapered end of said first stand portion is adjacent to said tapered end of said second stand portion, and
   wherein the pair of stand portions define a second device retention angle relative to the horizontal when the tapered end of the first stand portion is diagonally opposite said tapered end of said second stand portion.

2. The apparatus of claim 1, wherein the pair of stand portions are made of a light-weight material, the material encapsulated in a cover.

3. The apparatus of claim 2, wherein said light-weight material comprises a foam material.

4. The apparatus of claim 3, wherein said foam is polystyrene foam.

5. The apparatus of claim 4, wherein the cover of one of the pair stand portions includes a storage pouch.

6. The apparatus of claim 1, further comprising:
   a support strap coupled to one of the pair of stand portions for supporting a device on the pair of stand portions,
   said support strap having a closure means for retaining said support strap around the exterior of a device.

7. The apparatus of claim 6, wherein the closure means comprises a hook and loop type fastener.

8. The apparatus of claim 6, wherein said closure means comprises a loop to permit said support strap to double back on itself and a hook and loop type fastener on one side of said strap to secure said strap.

9. The apparatus of claim 1, wherein the first device retention angle is less than 30°.

10. The apparatus of claim 1, wherein the second device retention angle is approximately horizontal.

11. The apparatus of claim 1, wherein said detachable coupling means comprises a hook and loop type fastener.

12. An apparatus comprising:

a first wedge-shaped stand portion; and a support strap coupled to the stand and adapted to surround the exterior of a device, the support strap having a closure means for retaining the support strap at a location around the device, the wedge-shaped stand portion defining a first device retention angle relative to the horizontal.

13. The apparatus of claim 12, wherein the closure means comprises a hook and loop type fastener.

14. The apparatus of claim 12, wherein the closure means comprises a loop to permit the support strap to double back on itself and a hook and loop type fastener on one side of the strap to secure the strap.

15. The apparatus of claim 12, wherein the first wedge-shaped stand portion comprises a polystyrene foam material.

16. The apparatus of claim 15, wherein the polystyrene foam material is encapsulated in a cover, and wherein the support strap is coupled to the cover.

17. The apparatus of claim 12, further comprising:

a second wedge-shaped stand portion; and detachable coupling means to couple the first and second wedge-shaped stand portions, wherein the pair of wedge-shaped stand portions define a second device retention angle relative to the horizontal when the tapered end of first stand portion is adjacent to the tapered end of the second stand portions, and wherein the pair of wedge-shaped stand portions define a third stand retention angle relative to the horizontal when the tapered end of the first stand portion is diagonally opposite the tapered end of the second stand portion.

18. The apparatus of claim 17, wherein the detachable coupling means comprises a hook and loop type fastener.

19. The apparatus of claim 17, wherein the second device retention angle is not more than 30°.

20. The apparatus of claim 12, wherein the first device retention angle is not more than 17°.

* * * * *